INVENTOR
Albert Hilb

Jan. 11, 1955 A. HILB 2,699,240
COUPLING
Filed July 13, 1953 2 Sheets-Sheet 2

INVENTOR
Albert Hilb
by
Stevens, Davis, Miller & Mosher
his attorneys

United States Patent Office 2,699,240
Patented Jan. 11, 1955

2,699,240

COUPLING

Albert Hilb, Witten (Ruhr), Germany

Application July 13, 1953, Serial No. 367,652

Claims priority, application Germany July 21, 1952

10 Claims. (Cl. 192—48)

The invention relates to hydrostatic couplings wherein the transfer of the rotational moment is effected by gear pumps or the like provided within the coupling.

It is known that in couplings of this type, the primary part of the coupling, connected with the driving shaft, contains a series of pinions which are distributed uniformly over the circumference of the coupling and which mate with a larger gear of the secondary part of the coupling. In effect, each pinion constitutes, in combination with the larger gear, a gear pump. The gear pumps work against pressure valves, and when necessary, also against a common pressure valve which is frequently constructed as a spring urged adjustable safety valve. In the operation of couplings of this type, the gear pumps tend to convey the pressure medium (preferably pressure oil) with which they are filled. This tendency to convey is counteracted by the pressure valve or valves which have the effect of shutting off the oil circulation causing the pinions to carry along the large gear of the secondary part.

As long as the rotational moment, transferred by the coupling, does not exceed in magnitude the adjusted opening pressure of the pressure valve, the coupling effect is maintained aside from a slight material slippage caused by unavoidable leakages. If the rotational moment in the coupling increases, for example by rotational speeds in the drive system above the adjusted value of the pressure valve, then the oil pressure forces the valve open and the oil circulates through the system. During such times the coupling effect is lost and slippage occurs.

A disadvantage of this type of hydrostatic coupling resides in the fact that, in operation, the coupling components are not capable of being coupled and decoupled at will. In order to achieve this end, additional friction couplings must be inserted into the system or alternatively, it is necessary to provide some external means of opening and closing the pressure valve or pressure valves controlling the gear pumps during operation thereof. In the latter case, however, it is necessary, in uncoupled condition for the gear pumps to circulate a relatively large quantity of oil through oil channels. For this, the cross section of the channels are normally inadequate. To increase the cross section of the channels to workable dimensions would result in the overall size of the coupling becoming too large and thus cumbersome.

The basic thought underlying the present invention resides, therefore, in combining a friction coupling necessary for decoupling with a hydrostatic coupling in such a way that both constitute a uniform entity.

Thus, in accordance with the invention, the secondary part of the hydrostatic coupling is arranged to contain an additional friction coupling which is preferably controlled by a pressure medium. The combining of the secondary part of the hydrostatic coupling with the friction coupling offers the additional advantage that in case of decoupling of the drive, the prime mover, for example a diesel engine, continues to run with the hydrostatic coupling. Consequently, even though the friction coupling is in its uncoupled condition, yet the hydrostatic coupling will exert a damping action upon the prime mover in the case of a critical rotational speed. If oscillations occur when the prime mover is idling, which result in knocking of the drive shaft, the pressure valves or the common pressure valve associated with the gear pumps cause the secondary part of the hydrostatic coupling to decouple from the rotating mass whereby the oscillation system is interrupted. Additionally, the slippage forces within the hydrostatic coupling counteract the knocking of the drive shaft and act to break it.

The combined coupling of the present invention produces, therefore, a damping action not only at critical rotational speeds while it is coupled, but also while in decoupled condition with respect to the prime mover which continues to revolve. This action cannot take place if the hydrostatic coupling itself is not constructed to be decoupled if, for example, the pressure valves or valve are opened for decoupling of the drive.

An additional essential feature of the invention resides in the structural combination of the two couplings. Hydrostatic couplings have been constructed heretofore in such a way that the primary part concentrically surrounds, with its pump pinions, a secondary part having a larger spur wheel that notches with the pump pinion.

In accordance with the present invention, the primary part of the coupling is preferably centrally arranged with respect to the pump pinions, and the secondary part, which is now provided with interior gears, surrounds the primary part. By arranging the parts in this fashion, it is possible to combine an additional friction coupling with the hydrostatic coupling in a simple manner. The friction coupling, for its part, again concentrically surrounds the secondary part with the secondary part of the hydrostatic coupling forming the primary part of the friction coupling. This will result, as is readily apparent, in a very simple construction characterized by an overall outer diameter of the total apparatus that is not too large. In prior constructions, the outer diameter of the hydrostatic coupling was dependent upon the outwardly geared wheel of the secondary part. The forces to be transferred by the coupling determined, with otherwise equal conditions, the diameter of the above mentioned spur wheel, and the outer diameter of the total coupling was then derived necessarily from the fact that the pump pinions, with its oil channels, were located outside of the above mentioned spur wheel.

As distinguished from these prior constructions, the secondary part in the present case is constructed with an inner gearing with the primary part of the coupling arranged centrally thereof. Hence, an essentially smaller diameter than heretofore known is possible. Further, this unique arrangement enables the additionally provided friction coupling to be placed at the outside of the secondary part and the whole housed without excessive enlarging of the outer diameter of the total apparatus. For the practical carrying out of the invention, it is of special advantage that the friction coupling be constructed as a pressure medium controlled coupling. Preferably, known couplings of this type are used which are provided with one or more circular hoses which effect a coupling action by the introduction therein of a pressure medium.

A very essential feature of the invention resides moreover in the fact that in the event of slippage of the hydrostatic coupling there will occur automatically a decoupling of the additional friction coupling. This decoupling can be controlled in such a way that it will result only if the slippage is of a certain magnitude, for example, the system can be controlled to decouple only when the driven shaft is more or less blocked. A decoupling of this kind is important, for example, if the coupling is built into the drive of an ice packer.

When the additional friction coupling is operated by a pressure medium, the automatic decoupling is preferably effected by a safety valve having one or more pistons. In the case of slippage of the hydrostatic coupling, the safety valve is set in motion to interrupt the feed conduit of the pressure medium to the friction coupling and to open the return conduit of the pressure medium from the friction coupling. The impulse to control the decoupling of the friction coupling can be derived from the pressure in the feed conduit of the hydrostatic coupling. The pressure medium (pressure oil), arriving at the hydrostatic coupling, operates, in this case, the aforementioned safety valve to maintain the friction coupling as long as the pressure in the feed conduit of the hydrostatic coupling is normal. If the hydrostatic coupling is subject to slippage, however, the pressure in the feed conduit is lowered with increased slippage, i. e., the pressure is no longer capable of operating the safety valve to maintain the friction coupling. The safety valve is suitably constructed to decouple the friction coupling responsive to lowering of pressure in the feed conduit to the hydrostatic coupling.

In connection with the combining of a hydrostatic and a friction coupling, the present invention provides a novel pressure medium discharge from the hydrostatic coupling. Heretofore, there was used with prior hydrostatic couplings a so-called open oil flow. The oil was pumped into the coupling and in case of slippage of the coupling it was caused to be directly discharged through the pressure valves. The coupling, therefore, had to be coupled. In constructions of this nature, the housing of the additional friction coupling was intricate and complicated. A major problem in the design of the housing was to provide for the discharge of the oil escaping from the pressure valves in such a way that it would not contaminate the friction coupling.

According to this invention, therefore, both the oil feed to and the oil discharge from the hydrostatic coupling is effected through the hollow drive shaft thereof. Consequently, the coupling itself need only be sealed against oil leakage. With this novel construction, there is the further advantage that a larger dry frictional valve of the friction coupling can be assumed with safety.

Other objects and advantages of the present invention will become apparent from a detailed consideration of the following description when taken with the drawings in which.

Figure 1:
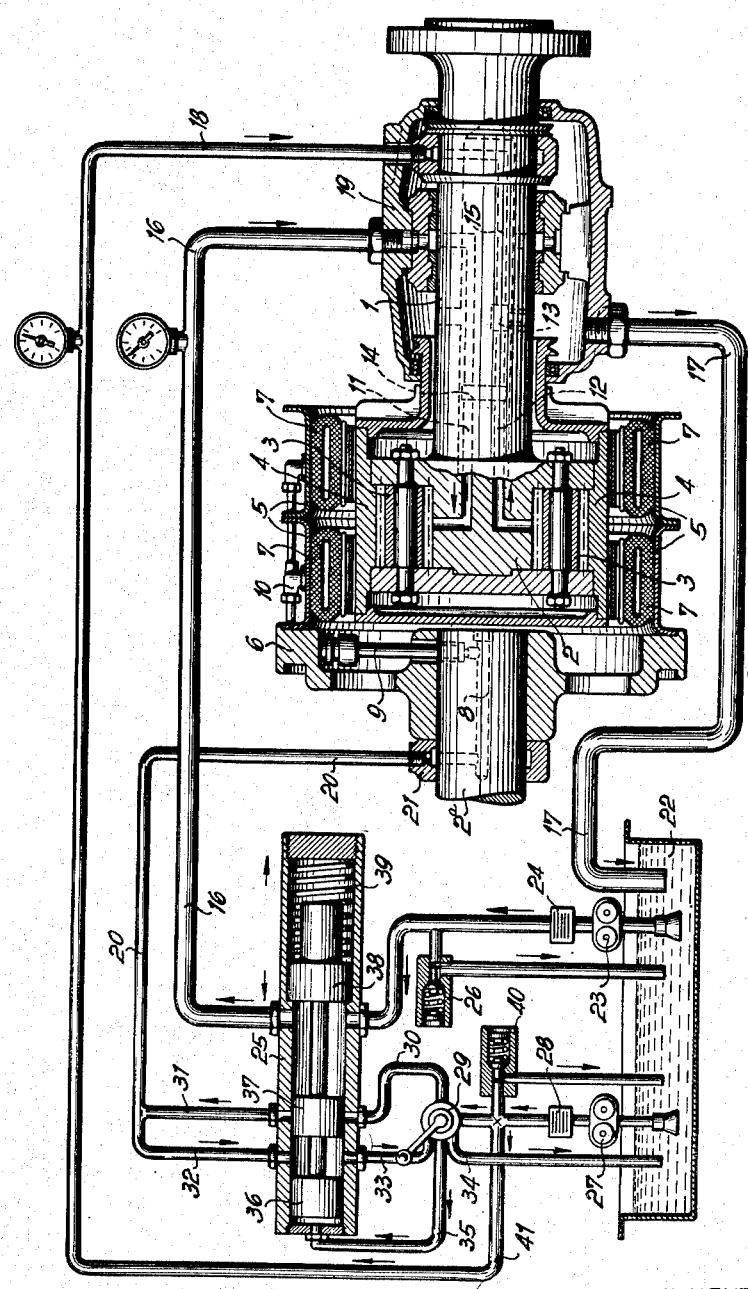
Figure 1 is a view of one embodiment of the present invention showing the coupling and safety valve in section.

Referring now to the drawings, Figure 1 shows one embodiment of the invention. A primary part 2 of a hydrostatic coupling is screwed onto a hollow drive shaft 1 associated in a conventional way with a prime mover (not shown). The drive shaft 1 at its end within the coupling is provided with axially extending bores which are uniformly distributed over its circumference, pump pinions 3 being housed therein. The bores open outwardly so that the pinions 3 extend therefrom, and mesh with inner gearing of a secondary part 4.

This secondary part 4 forms the primary part of a friction coupling concentrically surrounding it. The secondary part 5 of said friction coupling is attached to a support ring 6 which, in turn, is wedged on driven shaft 2a. The friction coupling has two circular tubes 7 provided with frictional surfaces. A pressure medium is fed to the circular tubes 7 through a bore 8 of the driven shaft 2a and pipe sections 9 and 10 whereby, as a result of the expansion of the circular tubes, the coupling action is effected.

The oil inlet 11 and oil outlet 12 for gear pumps, formed by pinions 3 and the interior gearing of the secondary part 4, are located in the drive shaft 1, and also a pressure valve 13, common for all gear pumps, and an automatic reversing valve 14 which automatically controls the inlet and outlet conduits in the event of a reversal of the rotational direction of the coupling are located in the drive shaft 1.

Pressure valve 13 is opened when the pressure in the oil outlet 12 becomes too high. Its opening pressure is hydraulically controlled by virtue of oil acting, through conduit 15, upon the valve in a closing sense. Actually, the pressure of the oil arriving at valve 13 through conduit 15 when greater than the pressure in conduit 12 forces a piston within valve 13 to close conduit 12. The construction of valve 13 will be hereinafter described in greater detail with respect to Figures 4 and 5. The oil inlet conduit 16 and the oil discharge conduit 17 for the hydrostatic coupling and the pressure oil conduit 18 for control of the pressure valve 13 are all connected to a support 19 for the coupling. The conduits 16 and 18 lead to the conduits 11 and 12 within the drive shaft 1, whereas the conduit 17 is connected to the bottom of support 19.

The feed conduit 20 for the pressure medium of the friction coupling is attached by a ring 21 to driven shaft 2a.

From a reservoir 22, the oil is sucked by a gear pump 23 and conveyed via filter 24 through a safety valve 25 into conduit 16. The oil pressure is adjusted by a pressure relief valve 26. A second gear pump 27 conveys the oil through a filter 28, a rotary valve 29, conduit 30 and then through safety valve 25 and feed conduit 31 into conduit 20. Conduit 32, likewise connected to conduit 20 passes through safety valve 25, conduit 33 to rotary valve 29 and through conduit 34 to the reservoir 22. An additional conduit 35 leads from rotary valve 29 to safety valve 25.

The safety valve 25 includes a cylindrical housing in which a control member or spindle having mounted thereon three pistons 36, 37, and 38 is arranged longitudinally slidable. The pistons are spaced apart on the spindle and connected together by the spindle. The piston 38 has a larger diameter than the other pistons and is spring urged at its side remote from the other pistons by means of a pressure spring 39. The force exerted by spring 39 is adjustable by any suitable means.

The pressure of the oil, conveyed by gear pump 27, is adjusted by a pressure relief valve 40. This pressure is transferred to the pressure valve 13 of the hydrostatic coupling through a branched conduit 41 which leads to conduit 18.

Figure 2:
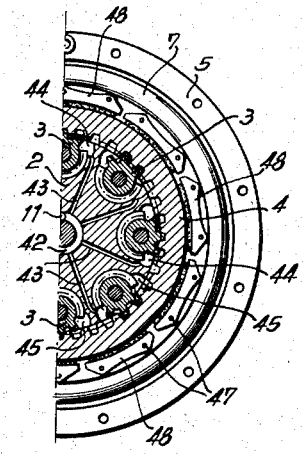
Figure 2 is a view in section taken along line 2—2 of Figure 1.

The structure of the hydrostatic coupling is shown in greater detail in Figure 2. The primary part 2 of the hydrostatic coupling has an annular channel 42 from which conduits 43 radiate. Each conduit 43 leads to the suction chamber 44 of each gear pump. The pressure chambers 45 of the gear pumps are similarly connected by radial conduits to an annular channel. Oil inlet conduit 11 leads to channel 42 and conduit 12 leads from the other annular channel. The annular channels are located axially spaced in the primary part 2. More particularly, they can be grooved in the opposite faces of primary part 2. In Figure 1, the inlets and outlets for the gear pumps are shown, for the sake of simplicity, in the center of primary part 2.

Figure 3:
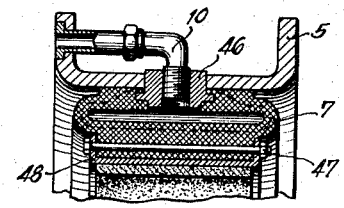
Figure 3 is an enlarged view in section showing the friction coupling.

The frictional coupling is shown in greater detail in Figures 2 and 3. The right annular hose 7 of Figure 1 is shown enlarged in Figure 3. The annular hose 7 is attached to the secondary part 5, for example, by being directly vulcanized thereto. The pressure oil to expand hose 7 is admitted through pipe section 10 which is screwed into fitting 46, the bore of which leads into the inner hollow space of annular hose 7. Textile inserts (shown in dotted lines) are employed to reinforce hose 7. The inner portion of annular hose 7 is shown as being thickened and is provided with axial bores to facilitate the attachment of a plurality of brake shoes 48 by means of bolts and nuts 47. Brake shoes 48 are provided with frictional surfaces that bear upon the outer surface of secondary part 4 of the hydrostatic coupling when hose 7 is expanded.

The action of pressure valve 13 is as follows: Suction gear pump 23 sends oil through safety valve 25 into conduit 16 from which it reaches pump pinions 3 through support 19 and oil feed conduit 11. If the hydrostatic coupling is slipping, oil is conveyed through conduit 12 and through pressure valve 13. The overflowing oil in support 19 runs at no pressure through conduit 17 to the reservoir 22. The pressure at which pressure valve 13 is opened is controlled by adjusting the pressure relief valve 40 so that the overload moment at which the hydrostatic coupling slips will result in a pressure in conduit 12 greater than the pressure in conduits 15 and 18.

For the supply of the oil pressure to pressure valve 13 there can be provided, if necessary, a special gear pump.

The oil, conveyed from the gear pump 27 and used for coupling the friction coupling, is controlled mainly by rotary valve 29. This rotary valve can be adjusted to three positions, "Out," "Start" and "Operation." In the position "Out," the conduits 30 and 31 are interrupted by piston 37, but the conduit 33 is connected with conduit 34. Thus, a path is provided between conduit 20 and reservoir 22 through conduit 32 and safety valve 25. Position "Out" is shown in the drawing. The oil being able to escape freely from tubes 7, the friction coupling will have no pressure and will be decoupled. When the rotary valve 29 is moved into "Start" position, the conduit 30 is connected with gear pump 27. The oil reaching conduit 30, however, is temporarily blocked by piston 37. In "Start" position, the conduit 35 is also connected with gear pump 27 through rotary valve 29 so that oil is caused to arrive at the rear of piston 36. The pressure in conduit 35 acting against the control organs 36, 37 and 38 in the rear face of piston 36 causes the spindle and pistons to shift to the right compressing spring 39. This will result in pistons 36 and 37 being placed in coupling position. The flow from conduit 30 to 31 is unblocked by the shifting of piston 37, and the flow from conduit 32 to conduit 33 is blocked by the shifting of piston 36. The oil under pressure can now flow through conduit 30, through conduit 31, conduit 20, etc., to the friction coupling and the latter is again coupled.

After the coupling is in operation, the rotary valve 29 is placed in position "Operation." By so doing, the oil feed through conduit 35 to safety valve 25 is again interrupted and conduit 35 is connected with conduit 34. Hence, the pressure is released in conduit 35 and the space in the safety valve 25 at the rear of 36. The control member and its associated pistons 36, 37 and 38, however, remain in their previous position because the oil pressure from pump 23 acts stronger upon the larger face of control piston 38 than upon the smaller face of piston 37. Thus, if the driven shaft 2a, due to overload, becomes more or less blocked, the pinions 3 roll around the interior gear of the likewise blocked secondary part 4 of the hydrostatic coupling. This action results in the oil in the coupling being conveyed through pressure valve 13 and returned to the reservoir 22. Also oil is sucked from conduit 16. Since gear pump 23 supplies a constant quantity of oil, the suction of pinions 3 causes lowering of the oil pressure in conduit 16. The oil pressure in front of control piston 38 is thereby also decreased and the force exerted by spring 39 becomes strong enough to return the control member to its initial position, i. e., the decoupling position for the friction coupling. Piston 37 again blocks the passage from conduit 30 to conduit 31, and piston 36 opens the passage from conduit 32 to conduit 33. The friction coupling is again without pressure and consequently decoupled. Thus, the pressure drop in the oil feed conduit 16 to the hydrostatic coupling is used for decoupling the friction coupling. Obviously, it is also possible to provide a different impulse for decoupling of the friction coupling. It is possible, for example to provide in conduit 16 a manometer having a minimum contact which would be energized when the minimum pressure is reached and which would control the coupling parts of the friction coupling in an electrical manner. If necessary, the friction coupling could even be controlled by magnetic means.

The aforementioned automatic reversing valve 14 is provided for the purpose of allowing the coupling to be used in both directions of rotation. The oil inlet 11 and the oil outlet 12 are automatically interchanged by valve 14 responsive to the rotational direction of the drive shaft 1 so that the prevailing oil withdrawal which is under pressure is always connected with the pressure valve 13. The structure of the two valves 13 and 14 is shown in Figures 4 and 5.

Figure 4:
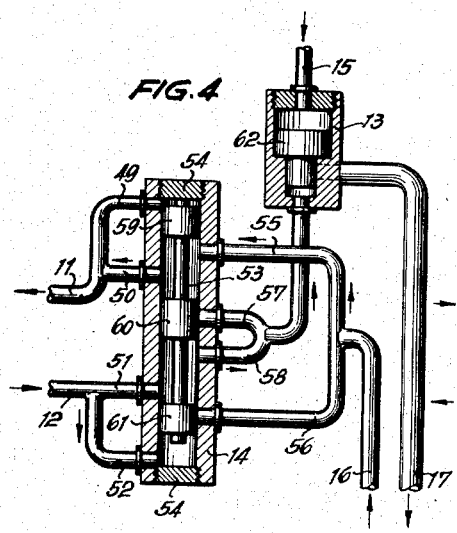
Figure 4 is a view showing the construction and operation of the reversible valve and pressure valve for clockwise rotation of the prime mover.
Figure 5:
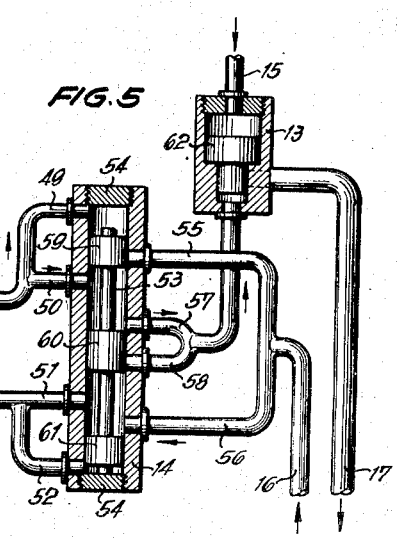
Figure 5 is a view similar to Figure 4 for counterclockwise rotation of the prime mover.

In Figure 4, the conduit 11 is the oil inlet and the conduit 12, the oil outlet. Both conduits 11 and 12 are connected to branches 49, 50 and 51, 52 respectively, which are connected to the reversing valve 14. Valve 14 consists of an elongated cylinder in which is housed a spindle 53 having three pistons 59, 60, 61 mounted thereon. Both ends of the cylinder are closed by screw threaded plugs 54. The oil inlet conduit 16 is likewise connected with two branches 55 and 56 to the reversing valve 14 and, additionally, pressure valve 13 is connected to reversing valve 14 by two branches 57, 58. Branch 55 is controlled by piston 59, branches 57 and 58 by piston 60, and branch 56 by piston section 61.

If conduit 12 is serving as the oil outlet from the coupling, it contains oil under pressure. The oil pressure in conduit 12 acts through branch 52 upon piston 61 to hold the spindle 53 in its uppermost position as shown in Figure 4. The oil from conduit 12 flows through branch 51, valve 14, branch 58 to pressure valve 13. This flow is illustrated by the arrows in Figure 4. The valve 13 includes a piston 62 which is urged by the oil pressure prevailing in conduit 15 to close conduit 17. When this oil pressure is overcome by a sufficient pressure in conduit 12, the oil will flow from the coupling to outlet conduit 12 and through oil outlet 17 to reservoir 22. From this reservoir, the oil recirculates through conduit 16, branch 55, reversing valve 14, branch 50 and into oil inlet 11 and from there to the coupling. As can be seen from the position of the reversing valve 14 according to Figure 4, the branches 57 and 56 are closed by pistons 60 and 61. The position of reversing valve 14 in Figure 4 corresponds, for example, to the clockwise rotation of the coupling. Hence, when the prime mover is reversed and the coupling caused to rotate counterclockwise, the reversing valve 14 will occupy the position shown in Figure 5. Corresponding parts in the two figures are referred to by the same reference numerals. Piston 53 is now held in its lowermost position by the oil pressure in conduit 11, which now serves as the oil outlet, acting upon piston section 59. The oil withdrawn from the coupling through conduit 11 now follows the path marked by the arrows which path includes branch 50, valve 14, and branch 57 leading to the pressure valve 13. The inflowing oil from conduit 16 passes through branch 56, valve 14, and branch 51 into conduit 12. The reversing valve 14 thereafter automatically reverses the oil inlet and oil outlet conduits whenever the coupling rotates in the opposite direction.

Although this invention has been shown and described in a preferred embodiment, it is clear that changes and modifications obvious to one skilled in the art are within the spirit, scope and contemplation of the present invention.

What is claimed is:

1. A combination coupling for coupling a drive shaft and a shaft to be driven that comprises a hydrostatic coupling and a friction coupling, said hydrostatic coupling including a primary part arranged with a drive shaft and a secondary part, said primary part including a plurality of pinions mounted for free rotation and disposed about the exterior thereof, said secondary part being annular in form and surrounding said primary part, said secondary part being characterized by interior gearing in meshing engagement with said pinions, thus forming in effect a plurality of gear pumps, feeding means to enable a fluid to be supplied to one side of said gear pumps, withdrawal means to enable fluid to be removed from the other side of said gear pumps, blocking means to prevent fluid from being removed from said gear pumps to cause said gear pumps to become locked so that said primary part will be effectively hydrostatically coupled to said secondary part thereby to enable power to be transmitted from said driving shaft through said coupling, said secondary part of the hydrostatic coupling having mounted thereon said friction coupling which is arranged with a shaft to be driven whereby the combined coupling of said hydrostatic coupling and said friction coupling will enable power to be transmitted from said driving shaft through said couplings to said shaft to be driven.

2. A combination coupling for coupling a drive shaft and a shaft to be driven that comprises a hydrostatic coupling and a friction coupling, said hydrostatic coupling including a primary part arranged with a drive shaft and a secondary part, said primary part including a plurality of pinions mounted for free rotation and disposed about the exterior thereof, said secondary part being annular in form and surrounding said primary part, said secondary part being characterized by interior gearing in meshing engagement with said pinions, thus forming in effect a plurality of gear pumps, feeding means to enable a fluid to be supplied to one side of said gear pumps, withdrawal means to enable fluid to be removed from the other side of said gear pumps, blocking means to prevent fluid from being removed from said gear pumps to cause said gear pumps to become locked so that said primary part will be effectively hydrostatically coupled to said secondary part thereby to enable power to be transmitted from said driving shaft through said coupling, the outside surface of the secondary part of the hydrostatic coupling functioning as the primary part of the friction coupling, said friction coupling also including a secondary part which concentrically surrounds said secondary part of the hydrostatic coupling, and said secondary part of said friction coupling being arranged with a shaft to be driven whereby power can be transmitted from said driving shaft through said couplings to said shaft to be driven.

3. A combination coupling for coupling a drive shaft and a shaft to be driven that comprises a hydrostatic coupling and a friction coupling, said hydrostatic coupling including a primary part arranged with a drive shaft and a secondary part, said primary part including a plurality of pinions mounted for free rotation and disposed about the exterior thereof, said secondary part being annular in form and surrounding said primary part, said secondary part being characterized by interior gearing in meshing engagement with said pinions, thus forming in effect a plurality of gear pumps, feeding means to enable a fluid to be supplied to one side of said gear pumps, withdrawal means to enable fluid to be removed from the other side of said gear pumps, blocking means to prevent fluid from being removed from said gear pumps to cause said gear pumps to become locked so that said primary part will be effectively hydrostatically coupled to said secondary part thereby to enable power to be transmitted from said driving shaft through said coupling, said friction coupling including a secondary part concentrically surrounding said secondary part of the hydrostatic coupling and an expansible element which effects a coupling action responsive to the introduction therein of a pressure medium, said secondary part of said friction coupling being arranged with a shaft to be driven, said expansible element producing a coupling action between said secondary part of said friction coupling and the exterior surface of said secondary part of said hydrostatic coupling which functions as the primary part of said friction coupling, and means to introduce into said expansible element pressure medium to cause the aforementioned coupling action to take place, said couplings functioning to transmit power from said driving shaft to said shaft to be driven.

4. A combination coupling as defined in claim 3 wherein control means are provided in conjunction with said means to introduce into said expansible element a pressure medium to release the pressure in said expansible element of the friction coupling, thereby to decouple same, responsive to a predetermined slippage of said hydrostatic coupling.

5. A combination coupling as defined in claim 3 wherein a pair of pumps are provided to supply fluid under pressure to said expansible element and said plurality of gear pumps, respectively, and a common reservoir to hold fluid is provided for said pair of pumps.

6. A combination coupling as defined in claim 3 wherein means are provided to convey the pressure prevailing in said friction coupling to said blocking means to control same.

7. A combination coupling as defined in claim 4 wherein a three-position rotary valve is provided in conjunction with said means to introduce into said expansible element a pressure medium and said control means to control said friction coupling, said rotary valve in its first position cooperating with said control means to release the pressure in said expansible element, said rotary valve in its second position causing said control means to orient itself to prevent the release of pressure from said expansible element and to enable said pressure medium to be supplied to said expansible element to achieve the friction coupling, and said rotary valve in its third position resulting in said control means being maintained in its oriented condition responsive to normal pressure in said feeding means to said hydrostatic coupling, and upon a predetermined decrease in pressure in said feeding means, said control means and rotary valve in its third position cooperating to release the pressure in said expansible element to release thereby the friction coupling.

8. A combination coupling as defined in claim 1 wherein said feeding means includes axial passages in said drive shaft.

9. A combination coupling as defined in claim 1 wherein a reversing valve is housed in said drive shaft and is connected with said feeding means and said withdrawal means, said reversing valve during one direction of rotation of said drive shaft directing fluid to be fed to and removed from said plurality of gear pumps through said feeding means and said withdrawal means, respectively, and during rotation of said drive shaft in the other direction directing fluid to be fed to and removed from said plurality of gear pumps through said withdrawal means and said feeding means, respectively.

10. A combination coupling for coupling a drive shaft and a shaft to be driven that comprises a hydrostatic coupling and a friction coupling, said hydrostatic coupling including a first part and a second part, said first part including a plurality of pinions mounted for free rotation and disposed about the exterior thereof, a second part being annular in form and surrounding said first mentioned part, said second mentioned part being characterized by interior gearing in meshing engagement with said pinions, thus forming in effect a plurality of gear pumps, feeding means to enable a fluid to be supplied to one side of said gear pumps, withdrawal means to enable fluid to be removed from the other side of said gear pumps, blocking means to prevent fluid from being removed from said gear pumps to cause said gear pumps to become locked so that said first mentioned part will be effectively hydrostatically coupled to said second mentioned part thereby to enable power to be transmitted through said coupling, said second mentioned part of the hydrostatic coupling having mounted thereon said friction coupling, a drive shaft, and a driven shaft, one of said shafts being operatively connected to said friction coupling and the other of said shafts being operatively connected to said first mentioned part of said hydrostatic coupling.

References Cited in the file of this patent

UNITED STATES PATENTS

| 1,186,661 | Kettler | June 13, 1916 |
| 1,667,565 | Radcliffe | Apr. 24, 1928 |
| 1,822,555 | Weiss | Sept. 8, 1931 |
| 2,166,961 | Marsh | July 25, 1939 |
| 2,213,836 | Gaddoni | Sept. 3, 1940 |

FOREIGN PATENTS

| 1,982 | Great Britain | 1912 |
| 282,018 | Great Britain | Apr. 19, 1928 |
| 285,970 | Great Britain | Feb. 23, 1928 |